United States Patent Office

> 3,233,995
> Patented Feb. 8, 1966

3,233,995
PROCESS AND APPARATUS FOR PRODUCTION OF
CONTINUOUS FIRE-POLISHED GLASS SHEET
Gustave Javaux, Brussels, Belgium, assignor to
Glaverbel, Brussels, Belgium
Filed June 1, 1965, Ser. No. 460,236
15 Claims. (Cl. 65—99)

This application is a continuation-in-part application of my earlier application, Ser. No. 200,519 filed June 6, 1962.

This invention relates to a process and apparatus for the production of a continuous sheet of fire polished glass in which, during its production, the sheet is slid between a gaseous atmosphere and a bath of metal or an alloy denser than the glass and inert to it and the materials of the tank containing the bath, the sheet being passed towards a zone where it is lifted from the bath at a sufficiently low temperature to avoid damage on contact with the solid members which move it along, the temperature of the bath enabling a fire polish to be obtained on the glass sheet.

A process of the above kind is known in which, in order to give the sheet a fire polished appearance, the glass is floated on a molten mass of metal whose melting point must be below 700° C.

In said process, the use of metals such as tin or lead or certain tin alloys has been suggested, the melting point of tin being 232° C. and of lead 327° C. These metals and alloys have the drawback of oxidizing in the presence of atmospheric air at the temperatures of utilization, so that it is necessary to produce a non-oxidizing atmosphere over the bath.

An object of the invention is to provide a process which does not involve this drawback and in which a normal air atmosphere may be maintained above the bath.

In the process provided in accordance with the invention, a sheet of glass is caused to slide on a melted metal or alloy which is non-oxidizable in air at the temperature required for obtaining a fire polish of the sheet and whose melting point is over about 750° C.

Among the metals which are suitable for use in accordance with the invention, are silver whose melting point is 960° C., gold whose melting point is 1060° C., and alloys of gold and silver, such as a silver alloy constituted of 72% silver and 28% copper which has a melting point of 780° C.

It is known to use a bath of silver to support a layer of melted material, for instance, a layer of glass which is fed under pressure into a mold between the said bath and a bath of another melted material less dense than that fed into the mold, and to cool the forward moving layer, by cooling the bath of silver until the viscosity of the moving layer is sufficiently high for it to be able to be extracted through one of the walls of the mold through a rectangular slot provided between the upper level of the lower bath and the lower level of the upper bath in order to avoid the two baths being able to escape through the said slot.

This process does not enable a fire polished sheet of glass to be obtained because the surface of the sheet is damaged by its passage through the slot and by the members which are used to extract the sheet from the mold and which must exert sufficient pressure on it to make it pass through the slot of section smaller than the section of the viscous layer of glass in the mold adjacent to the said slot. This process also involves the drawback that the speed of extraction of the sheet from the mold has to be accurately maintained in dependence on the flow of molten material poured into the mold in such a way that the thickness of the layer of glass near the outlet from the mold in always greater than the height of the slot but nevertheless remains close to this height.

In addition to the advantage of not requiring a non-reducing atmosphere, the metals on which the sheet of glass is caused to slide in the process in accordance with the invention likewise have the advantage of rendering the temperature of the sheet of glass uniform over its entire width much more quickly since their coefficients of thermal conductivity are very much higher than those of tin, lead, or tin alloys. For example, if the thermal conductivity of various metals is compared with that of silver, taking the constant of silver as equal to 1, then that of copper is 0.93, that of gold is 0.707, while that of tin is only 0.151 and that of lead is 0.082.

It is a further object of the invention to provide processes which are adaptable to the use of both soft and hard glass.

Soft glass as hereinafter referred to in the specification will be directed to a glass composition which has a viscosity of less than $10^7$ poises at a temperature of 1000° C., whereas hard glass will refer to a glass composition which has a viscosity of at least $10^7$ poises at 1000° C. Soft glass thus has a relatively low softening point, whereas hard glass has a relatively high softening point. Generally, soft glass contains alkalis such as common soda-lime glass, while hard glass does not contain alkalis, the soda being replaced by an alkaline earth oxide such as lime, magnesia or alumina.

In view of the relatively high temperature of the bath in order to maintain the same molten, the glass layer when it is ready for removal from the bath will be at a high temperature. If the glass is a hard glass it will generally be sufficiently viscous to be mechanically engaged and removed from the bath without damage to its fire polished surfaces. If the glass is soft glass it will be too viscous for handling and it will preferably be upwardly drawn from the bath into a thinner sheet and cooled to a temperature sufficiently low for engagement with rollers which can handle the cooled glass without damage to its fire polished surfaces.

Two embodiments of plants for carrying out the processes in accordance with the invention will now be described by way of example with reference to the accompanying drawings in which.

In these various figures the same reference numerals denote the same parts.

Figure 1:
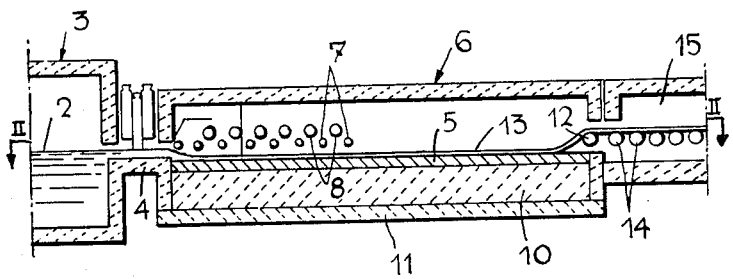
FIGURE 1 is a longitudinal section along line I—I of FIG. 2.
Figure 2:
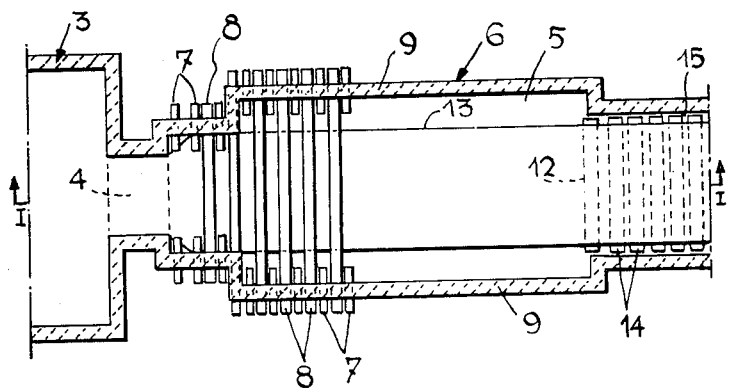
FIGURE 2 is a view taken in horizontal section along line II—II in FIG. 1.

The plant according to FIGS. 1 and 2 is adapted to produce a continuous sheet of fire polished glass which is hard glass, i.e., glass whose viscosity at 1000° C. has a viscosity of at least $10^7$ poises. Such type of glass has, for example, the following composition: $SiO_2$ 55%, $Al_2O_3$ 25%, CaO 5%, MgO 15%. Its viscosity is equal to $10^7$ poises.

The glass 2 is melted in a tank 3 and overflows a sill 4 onto a non-oxidizable metallic silver bath 5 contained in a tank 6. This bath is heated to a temperature between 965° C. and 970° C. Electric heating elements 7 and 8 heat the atmosphere at the entrance of the tank 6 in order to fire polish the upper surface of the formed glass sheet. The elements 7 supply heat solely in the vicinity of the lateral walls 9 and the elements 8 heat the tank 6 over its entire width. The bath rests on a layer of refractory material 10 supported by a layer of heat-insulating material 11.

The level of the metallic bath 5 is below that of the sill 4. The glass whose flow is regulated by the level of the glass and by the feed of primary materials into the tank 3 expands in width over the bath 5 while its thickness diminishes.

The melted glass 2 overflows the sill 4 at a temperature of 1400° C. and cools quickly while it spreads over the bath 5 and progresses towards the opposite end of the tank. This quick cooling is due to the high thermal conductivity of silver. At the exit end of tank 6 the glass sheet 13 is at a temperature of about 1000° C. and it is raised from the silver bath by a roller 12 with which it comes in contact at a temperature of about 950° C. At this temperature the viscosity of the hard glass is greater than $10^7$ poises and the fire polish of the sheet is not damaged by roller 12 nor by the conveying rollers 14 which feed the sheet into an annealing chamber 15.

The plant shown in FIGS. 1 and 2 is thus well adapted for the production of sheets of hard glass which are less expensive than the usual soft glass containing alkalis.

For the treatment of soft glass certain precautions must be taken, because the viscosity of this glass at 1000° C. is too low to permits its direct mechanical engagement. The viscosity is substantially lower than $10^7$ poises. For example, soda-lime glass has a viscosity at 1000° C. generally between $10^4$ and $10^{5.5}$ poises. In this case it is necessary to strongly cool the glass sheet when it leaves the metal bath 5 and to space substantially the engaging roller from the bath in order to allow the glass sheet to cool sufficiently before reaching such roller.

Figure 3:
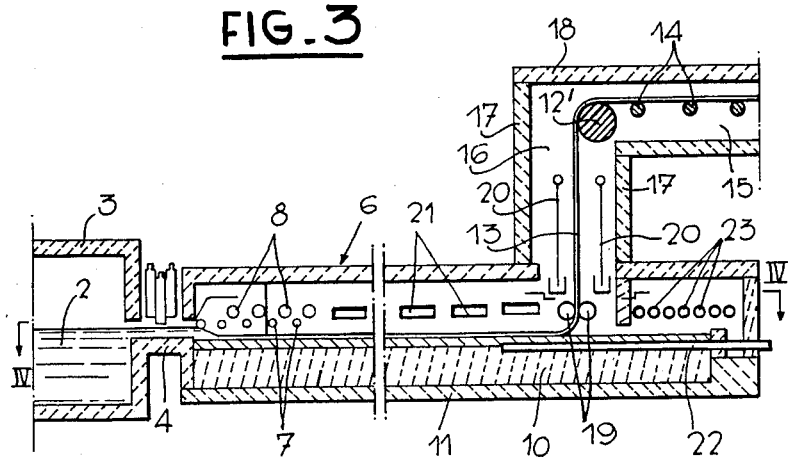
FIGURE 3 is a longitudinal section along line III—III of FIG. 4 in a second embodiment.
Figure 4:
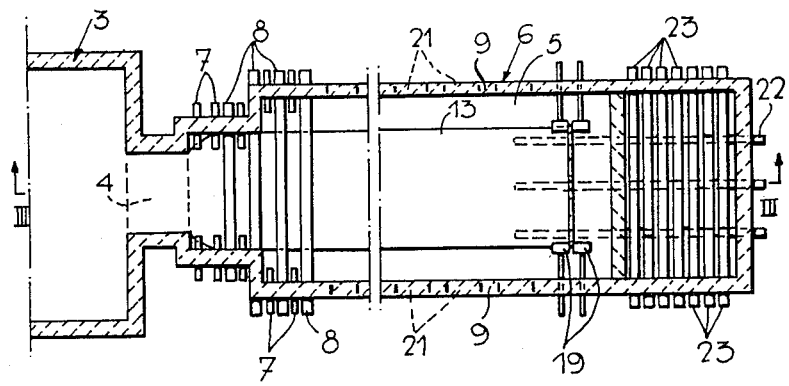
FIGURE 4 is a view taken in a horizontal section along the line IV—IV of FIG. 3.

FIGS. 3 and 4 show a plant adapted to treat well known soda-lime glass having the following composition: $SiO_2$ 72.6%, $Na_2O$ 14.2%, $K_2O$ 0.1%, $CaO$ 8.0%, $MgO$ 3.9%, $Fe_2O_3$ 0.1%, $Al_2O_3$ 1.1%.

As in the case of the plant of FIGS. 1 and 2, the melted glass flows over the sill 4 onto the silver bath 5 whose temperature is maintained between 965° C. and 970° C. At the exit end of the tank 6 a bending roller 12' is situated at about 90 cm. above the level of the silver bath 5. The roller 12' is disposed in a vertical compartment bounded by front and rear walls 17, lateral walls 16, and by the ceiling 18 of the annealing chamber 15.

The edges of the glass sheet 13 are gripped between knurled members 19 which prevent the sheet from narrowing under the pull exerted by the bending roller 12' and the conveying rollers 14 in the annealing chamber. During its upward movement, the sheet 13 passes between strong cooling elements 20, preferably constituted by wire nets on which water is circulated. Such cooling elements have an absorption factor close to 1.

Coolers 21 constituted by boxes in which water circulates are situated above the glass sheet 13 advancing along the silver bath 5.

The temperature of the glass overflowing the sill 4 is about 1250° C. The temperature of the glass sheet 13 is about 970° C. where it leaves the bath and about 600° C. when it comes into contact with roller 12'.

Heating elements 22 and 23 advantageously cooperate with the portion of the silver bath 5 which is no longer covered by the glass sheet in order to prevent solidification of the silver bath. Heating elements 22 project into the bath, while heating elements 23 are located above the bath.

When use is made of gold as the non-oxidizable metal bath, the plants are similar to those of FIGS. 1 to 4, except that the cooling of soft glass must be greater after leaving the metal bath, in order to take into account that the melting point and thereby the temperature of the gold bath is higher than that of the silver bath.

In the case where the bath is constituted by an alloy of 72% silver and 28% copper, having a melting point equal to 780° C., the cooling is adjusted such that the temperature of the glass sheet on leaving the bath is approximately 800° C.

At this temperature, a sheet of soda-lime glass is subjected to a lesser lengthening during its upward movement toward roller 12' than in the case of a bath of silver or gold, and the cooling of the ascending sheet is reduced when compared to a bath of silver or gold.

Numerous variations and modifications of the disclosed processes and apparatus will be readily apparent to thoses killed in the art, without departing from the scope and spirit of the invention as defined by the following claims.

What is claimed is:

1. A process for the production of fire polished glass comprising forming a continuous sheet of glass, forming in a tank, a bath of molten metal at a working temperature above 750° C., said molten metal being inert to air, to the glass and to the tank, sliding said continuous sheet longitudinally on said bath and moving the sheet along the bath with the use of solid members acting on the sheet which has left the bath, maintaining above 750° C. the temperature of the bath where the continuous glass sheet comes into contact with said molten metal, and diminishing the temperature of the sheet in the sliding direction of the sheet, the reduction of temperature being sufficient to avoid damage of the sheet due to being mechanically acted upon by the solid members, said bath of molten metal being selected from the group consisting of silver, gold and alloys thereof having a melting point greater than 700° C.

2. A process as claimed in claim 1, wherein said glass has a viscosity greater than $10^7$ poises at a temperature of 1000° C., the glass being at a temperature of between 1250 and 1400° C. at entry into the tank, and at a temperature of between 750 and 1000° C. at the exit end of the tank, the glass being directly engaged by lifting rollers and conveying rollers at the exit end of the tank for being removed from the bath, the glass being sufficiently hardened at said end of the tank whereby the fire polished surfaces thereof are not damaged by contact with the rollers.

3. A process as claimed in claim 1, wherein said glass has a viscosity less than $10^7$ poises at a temperature of 1000° C., the glass being at a temperature of between 1250 and 1400° C. at entry into the tank and at a temperature of between 750 and 1100° C. at the exit end of the tank, the glass being upwardly drawn and cooled at the exit end of the tank to achieve a temperature sufficiently low that the glass can be thereafter engaged and advanced without damage to the fire polish on its surfaces.

4. A process as claimed in claim 3, wherein said glass sheet is cooled at the exit end of the tank to a temperature of about 600° C.

5. A process for the production of a continuous sheet of fire polished glass, said process comprising forming a continuous sheet of molten glass, sliding the sheet continuously in a longitudinal direction onto a bath of molten metal which is contained in a tank, said metal of the bath being selected from the group consisting of silver, gold and alloys thereof, said metals being non-oxidizable whereby the tank may contain normal atmospheric air and the bath be directly exposed thereto, said metal of the bath being inert with respect to the glass and the tank, the metal of said bath having relatively high coefficients of thermal conductivity thereby rendering the temperature of the sheet of glass uniform over its entire width relatively quickly, diminishing the temperature of the sheet in the direction of sliding of the sheet whereby the sheet undergoes cooling as it slides on the bath, engaging the sheet to raise the same upwardly from the level of the bath to remove the sheet from the metal bath, and conveying the sheet away from said bath by mechanically acting on said sheet at a zone thereof sufficiently cooled to avoid damage of the sheet due to its being mechanically acted upon.

6. A process as claimed in claim 5, wherein said sheet at the exit end of the tank is substantially at the same temperature as that of the bath thereat.

7. A process as claimed in claim 5, wherein said bath is at a temperature between 750 and 1100° C., said sheet being at a temperature between 1250 and 1400° C. at the entry end of the tank and at a temperature of between 750 and 1100° C. at the exit end of the tank.

8. A process for the production of a continuous sheet of fire polished glass, said process comprising forming a sheet of glass thicker than the final thickness desired for the sheet, sliding the thicker sheet on a bath of molten metal which is contained in a tank, said bath of molten metal being selected from the group consisting of silver, gold and alloys thereof having a melting point greater than 700° C. and being non-oxidizable when molten, said metal being inert with respect to the glass and with the material of the tank, diminishing the temperature of the sheet in the direction of sliding thereof on the bath, reducing the thickness of the sheet by drawing the same upwardly where it is removed from the bath and conveying the sheet of reduced thickness obtained by said drawing by mechanically acting on said sheet at a zone thereof sufficiently cooled to avoid damage to its fire polish due to its being mechanically acted upon.

9. Apparatus for the production of a continuous sheet of fire polished glass, said apparatus comprising furnace means for producing a continuous sheet of molten glass, a tank disposed adjacent the furnace means for receiving the sheet of glass therefrom, a molten metal bath in said tank onto which the sheet of glass is advanced, said bath being at a temperature of at least 750° C., said metal bath being non-oxidizable at said temperature and being inert with respect to the sheet of glass and the tank, the sheet of glass being fire polished as it advances along the bath and means for mechanically engaging the sheet of glass at a location at which the glass is sufficiently cooled to remove the sheet of glass from the bath without damage to its fire polish due to its being mechanically acted upon, said bath of molten metal being selected from the group consisting of silver, gold and alloys thereof having a melting point greater than 700° C.

10. Apparatus as claimed in claim 9, wherein said means for mechanically engaging the sheet comprises conveyor rollers, the apparatus further comprising means for engaging the sheet and drawing the same upwardly to reduce the thickness of the glass sheet and feed the sheet of reduced thickness to the conveyor rollers.

11. Apparatus as claimed in claim 10, comprising cooling means for cooling the sheet of glass as it is drawn upwardly.

12. Apparatus as claimed in claim 10, comprising heating means disposed in a region adjacent the means which draws the sheet upwardly for heating the bath where the sheet has been drawn therefrom.

13. Apparatus as claimed in claim 9, wherein said means for mechanically engaging the sheet comprises conveyor rollers located above the level of the bath in the tank for lifting the sheet and conveying the same away from the bath.

14. Apparatus as claimed in claim 10, wherein said means for drawing the sheet upwardly comprises a bending roller located above the bath, the bending roller and said conveyor rollers being at substantially the same level, said sheet passing over said bending roller to the conveyor rollers, and means for engaging the sheet only at the edges thereof at approximately the level of the bath to resist narrowing of the sheet as it is pulled upwardly by the bending roller, whereby the width of said sheet is maintained as the sheet is drawn upwardly and reduced in thickness.

15. Apparatus as claimed in claim 14, wherein said means for engaging the sheet at the edges thereof comprises knurled members disposed at said edges.

References Cited by the Examiner

UNITED STATES PATENTS

| 710,357 | 6/1902 | Heal | 65—95 |
| 3,083,551 | 4/1963 | Pilkington | 65—182 XR |

FOREIGN PATENTS 629,581  9/1949  Great Britain.

HOWARD R. CAINE, *Acting Primary Examiner.*